(No Model.)

F. S. PECKER.
LATHE TOOL.

No. 412,038. Patented Oct. 1, 1889.

Witnesses:
Fred. S. Greenleaf
Frederick L. Emery.

Inventor:
Frank S. Pecker,
by Crosby & Gregory
Attys.

UNITED STATES PATENT OFFICE.

FRANK S. PECKER, OF BOSTON, MASSACHUSETTS.

LATHE-TOOL.

SPECIFICATION forming part of Letters Patent No. 412,038, dated October 1, 1889.

Application filed February 27, 1889. Serial No. 301,361. (No model.)

*To all whom it may concern:*

Be it known that I, FRANK S. PECKER, of Boston, county of Suffolk, State of Massachusetts, have invented an Improvement in Lathe-Tools and Holders, of which the following description, in connection with the accompanying drawings, is a specification, like letters on the drawings representing like parts.

This invention has for its object to construct a lathe-tool and tool-holder which may be cheaply manufactured, easily adjusted to not only different inclinations with relation to the work, but also for right and left work.

In accordance with this invention the tool-holder has a tool-receiving hole made tapering from end to end and inclined with relation to the holder, and the shank of the tool is also made tapering to fit the said tapering inclined hole.

I have herein shown the tool-holder as having a tool-receiving hole at each end, and in such instance the said holes are differently inclined. The face of the tool is beveled, and while the holder herein to be described is designed to receive tools of any shape having tapering shanks, yet for many purposes I employ a tool quadrangular in cross-section and having two cutting-points, so that the said tool may be turned to be presented for right or left hand work, the beveled faces affording a clearance. The sockets being inclined enables the tool to be turned therein and be presented to the work in the many different positions desired.

Figure 1:
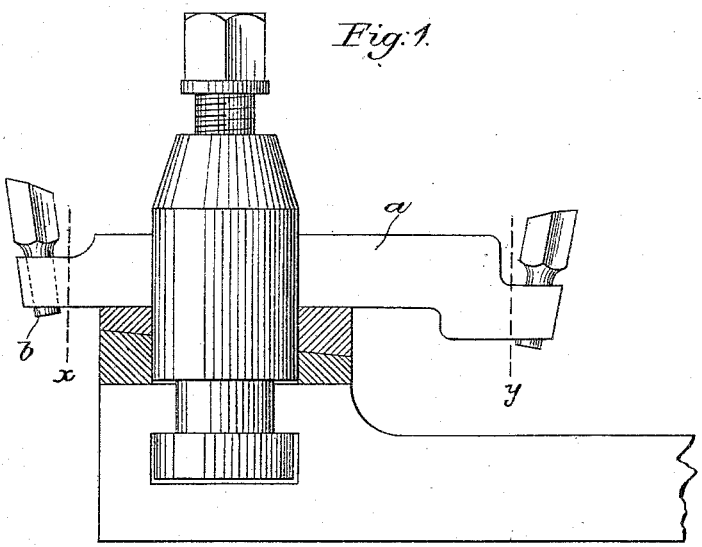
Figure 2:
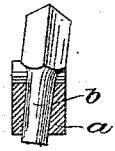
Figure 3:
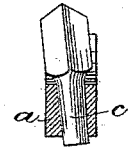
Figure 5:
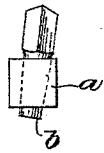
Figure 4:
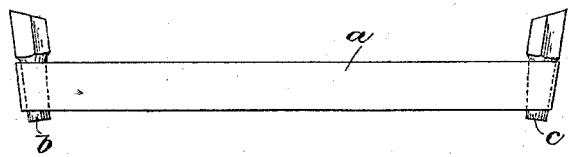
Figure 6:
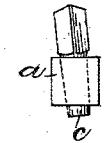

Figure 1 shows in side elevation a lathe-tool holder and tool embodying this invention; Fig. 2, a cross-section of the tool-holder, taken on the dotted line $x$, the tool being shown in elevation; Fig. 3, a cross-section of the tool-holder shown in Fig. 1, taken on the dotted line $y$, the tool being shown in elevation; Fig. 4, a side elevation of the tool-holder and tools held therein on a smaller scale; Fig. 5, a right-hand end view of the tool-holder and tool shown in Fig. 4, and Fig. 6 a left-hand end view of the tool-holder and tool shown in Fig. 4.

The tool-holder $a$, consisting of a bar, has at one or both ends a transverse tapering socket to receive the tapering shank $b$ or $c$ of the tool. When each end of the tool-holder is provided with a socket, the said sockets will preferably be inclined differently with relation thereto, as represented in Figs. 2 and 3.

The tools may have any desired shape of cutting-edge; but the one herein shown is quadrangular in cross-section and has two cutting-points, the face of the tool being beveled for clearance.

The tool-holder will be held in the lathe in any usual or suitable manner; but, in view of the fact that nearly every adjustment of the tool can be accomplished by means of the differently-inclined sockets, tilting of the tool-holder itself is deemed unnecessary.

I may, if desired, omit the tool and its socket at one end of the tool-holder.

By means of the tapering socket and tapering shank the tool may be quickly fixed in position, and in practice it has been found that an additional fastening is unnecessary.

In Fig. 1 I have shown one end of the tool-holder as shouldered or offset, to thereby enable the cutter to be made longer.

The tool herein described is equally as well adapted for a planer-machine.

I claim—

A lathe-tool holder having a transverse outwardly-inclined tapering socket, combined with the tool having a tapering shank to fit tightly in the said socket and be retained therein by friction only, substantially as described.

In testimony whereof I have signed my name to this specification in the presence of two subscribing witnesses.

FRANK S. PECKER.

Witnesses:
BERNICE J. NOYES,
FREDERICK L. EMERY.